United States Patent
Tsai

(10) Patent No.: US 10,926,711 B2
(45) Date of Patent: Feb. 23, 2021

(54) MOUNTING SPECIFICATION ADJUSTABLE FRONT FORK MOUNT

(71) Applicant: JYIN SHENG CO., LTD., Huatan Township, Changhua County (TW)

(72) Inventor: Yu-Lung Tsai, Huatan Township, Changhua County (TW)

(73) Assignee: Jyin Sheng Co., Ltd., Huatan Township, Changhua County (TW)

( * ) Notice: Subject to any disclaimer, the term of this patent is extended or adjusted under 35 U.S.C. 154(b) by 0 days.

(21) Appl. No.: 16/592,043

(22) Filed: Oct. 3, 2019

(65) Prior Publication Data

US 2020/0122644 A1    Apr. 23, 2020

(30) Foreign Application Priority Data

Oct. 18, 2018  (TW) .............................. 107136744 A

(51) Int. Cl.
| | |
|---|---|
| *B60R 9/00* | (2006.01) |
| *B60R 9/10* | (2006.01) |
| *B62K 21/06* | (2006.01) |
| *B60R 9/04* | (2006.01) |
| *B62K 21/02* | (2006.01) |
| *B60R 11/00* | (2006.01) |

(52) U.S. Cl.
CPC .................. *B60R 9/10* (2013.01); *B60R 9/04* (2013.01); *B62K 21/02* (2013.01); *B62K 21/06* (2013.01); *B60R 2011/004* (2013.01); *B60R 2011/0059* (2013.01)

(58) Field of Classification Search
CPC ....... B60R 9/10; B60R 9/04; B60R 2011/004; B60R 2011/0059; B62K 21/02; B62K 21/06

USPC .......................................................... 224/324
See application file for complete search history.

(56) References Cited

U.S. PATENT DOCUMENTS

| | | | | |
|---|---|---|---|---|
| 5,362,173 A | * | 11/1994 | Ng .......................... | B60R 9/048 224/315 |
| 6,494,351 B1 | * | 12/2002 | Dean ....................... | B60R 9/048 224/324 |
| 6,758,380 B1 | * | 7/2004 | Kolda ..................... | B60R 9/048 224/315 |
| 7,726,529 B2 | * | 6/2010 | Foley ....................... | B60R 9/10 224/324 |

(Continued)

FOREIGN PATENT DOCUMENTS

TW            M432580 U     7/2012

*Primary Examiner* — Peter N Helvey
(74) *Attorney, Agent, or Firm* — Muncy, Geissler, Olds & Lowe, P.C.

(57) ABSTRACT

A mounting specification adjustable front fork mount for mounting on a bike rack on a car roof to cooperate with a quick release for securing a bicycle front fork is disclosed to include a holder having a shaft tube with a protruding portion at each of two opposite ends of the shaft tube, and two mounting tubes each having a first coupling recess and a second coupling recess so designed that the bottom of the first coupling recess and the bottom of the second coupling recess are respectively spaced from the distal end of the mounting tube by a different distance. The protruding portion at each end of the shaft tube can be selectively engaged into the first coupling recess or the second coupling recess according to the specification of the bicycle front fork.

7 Claims, 5 Drawing Sheets

(56) References Cited

U.S. PATENT DOCUMENTS

| | | | |
|---|---|---|---|
| 7,757,917 B2* | 7/2010 | Bogoslofski | B60R 9/10 224/537 |
| D689,012 S * | 9/2013 | Kuschmeader | D12/408 |
| 9,457,630 B2* | 10/2016 | Anderson | B60D 1/24 |
| 9,845,057 B2* | 12/2017 | Settelmayer | B60R 9/10 |
| 9,873,385 B2* | 1/2018 | Tsai | B60R 9/048 |
| 2002/0026816 A1* | 3/2002 | Katsouros | B62H 5/001 70/233 |
| 2007/0012738 A1* | 1/2007 | Grim | B60R 9/10 224/324 |
| 2007/0119887 A1* | 5/2007 | Foley | B60R 9/048 224/324 |
| 2010/0078454 A1* | 4/2010 | Sautter | B60R 9/10 224/315 |
| 2011/0139840 A1* | 6/2011 | Kraeuter | B60R 9/10 224/324 |
| 2013/0062379 A1* | 3/2013 | Sautter | B60R 9/048 224/324 |

* cited by examiner

MOUNTING SPECIFICATION ADJUSTABLE FRONT FORK MOUNT

BACKGROUND OF THE INVENTION

1. Field of the Invention

The present invention relates to a mounting seat for a bicycle front fork, and more particularly to a mounting specification adjustable front fork mount.

2. Description of the Related Art

Commercial bike racks are roughly divided into roof-mounted type, back-mounted type, trailer-mounted type and in-car type. Among them, due to different considerations and factors such as different types of cars (car height, car interior space, etc. are different), whether the use of the attachments is more safety, and because of the owner's personal preferences, etc., there are people who like them. At present, the roof-mounted type to be installed on the roof of the car, which does not affect the driver's line of sight and is relatively less likely to scratch the car body, is more popular. They are also many types of roof-mounted bike racks, mainly comprising a front fork mount and a rear wheel mount. The front fork mount and the rear wheel mount are matched with two longitudinal poles on the roof of the car. When mounting the bicycle to bike rack on the roof of the car, the front wheel of the bicycle is generally removed, the front fork of the bicycle is clamped on the front fork mount, and the rear wheel of the bicycle is secured to the rear wheel mount by a belt passing through the rear wheel mount. Because the bicycle front fork has different specifications, a front fork mount cannot fit all kinds of bicycle front forks. In order to solve this problem, Taiwan No. M432580 discloses a bicycle front fork mount, which is designed to be assembled with different adapters to fit different bicycle front forks. In addition to the need to repeatedly disassemble the adapter when replacing, it is more common to forget to bring the adapter, or even the adapter has been lost. This prior art bicycle front fork mount can be selectively used with adapters of different specifications, however, it has the drawbacks of complicated adapter installation procedure and inconvenience of adapter carrying, resulting in poor use.

SUMMARY OF THE INVENTION

The present invention has been accomplished under the circumstances in view. It is the main object of the present invention to provide a mounting specification adjustable front fork mount, which can avoid forgetting to carry the adapter, does not necessary to repeatedly disassemble the adapter, and has the effect of easy adjustment.

To achieve this and other objects of the present invention, a mounting specification adjustable front fork mount is provided for mounting on a bike rack on a car roof for securing a bicycle front fork of any of a variety of specifications. The mounting specification adjustable front fork mount comprises a holder and two mounting tubes. The holder comprises a shaft tube. The shaft tube has a protruding portion extended from each of two opposite ends thereof for a predetermined length. The two mounting tubes each comprise an insertion section, an abutment section, and a latching section connected between the insertion section and the abutment section. The insertion sections of the two mounting tubes are respectively inserted from the two opposite ends of the shaft tube into the inside of the shaft tube. The latching section of each mounting tube is provided with a first coupling recess and a second coupling recess. The first coupling recess and the second coupling recess each have the bottom thereof respectively spaced from the distal end of the abutment section by a different distance. The first coupling recess and the second coupling recess are used for the insertion of the protruding portion of the shaft tube into abutment against the bottom of the first coupling recess or the second coupling recess in a selective manner so that when the protruding portion of the shaft tube is engaged in the first coupling recess or the second coupling recess, the protruding length of the abutment section of each mounting tube outside the shaft tube is different. The two mounting tubes are used with the shaft tube to cooperate with a quick release for clamping a bicycle front fork by means of the abutment section of each of the two mounting tubes.

Thereby, the present invention can select the first coupling recess or the second coupling recess for engagement with the protruding portion according to different bicycle front forks of different specifications, providing easy adjustment and ease of use.

DETAILED DESCRIPTION OF THE INVENTION

Figure 1:
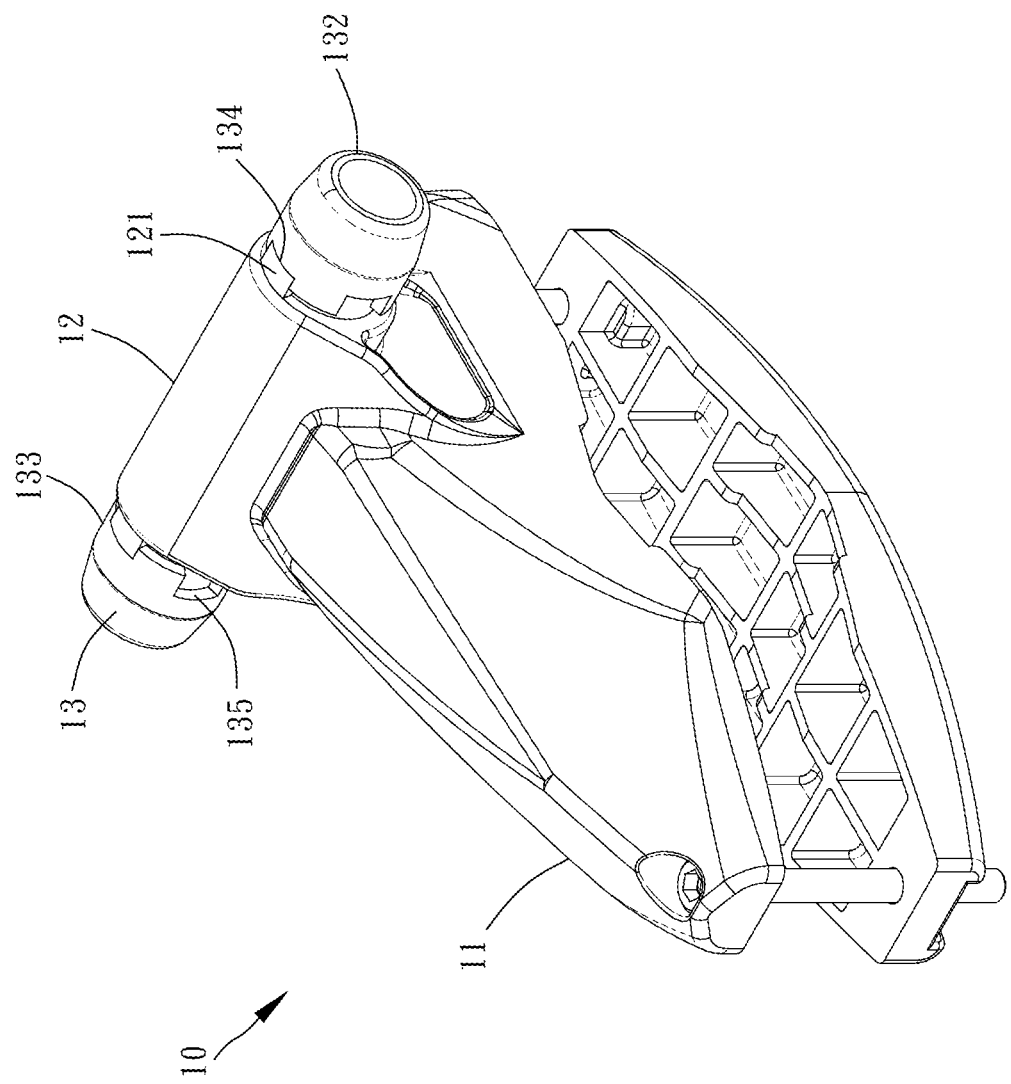
FIG. 1 is an oblique top elevational view of a mounting specification adjustable front fork mount in accordance with the present invention.
Figure 2:
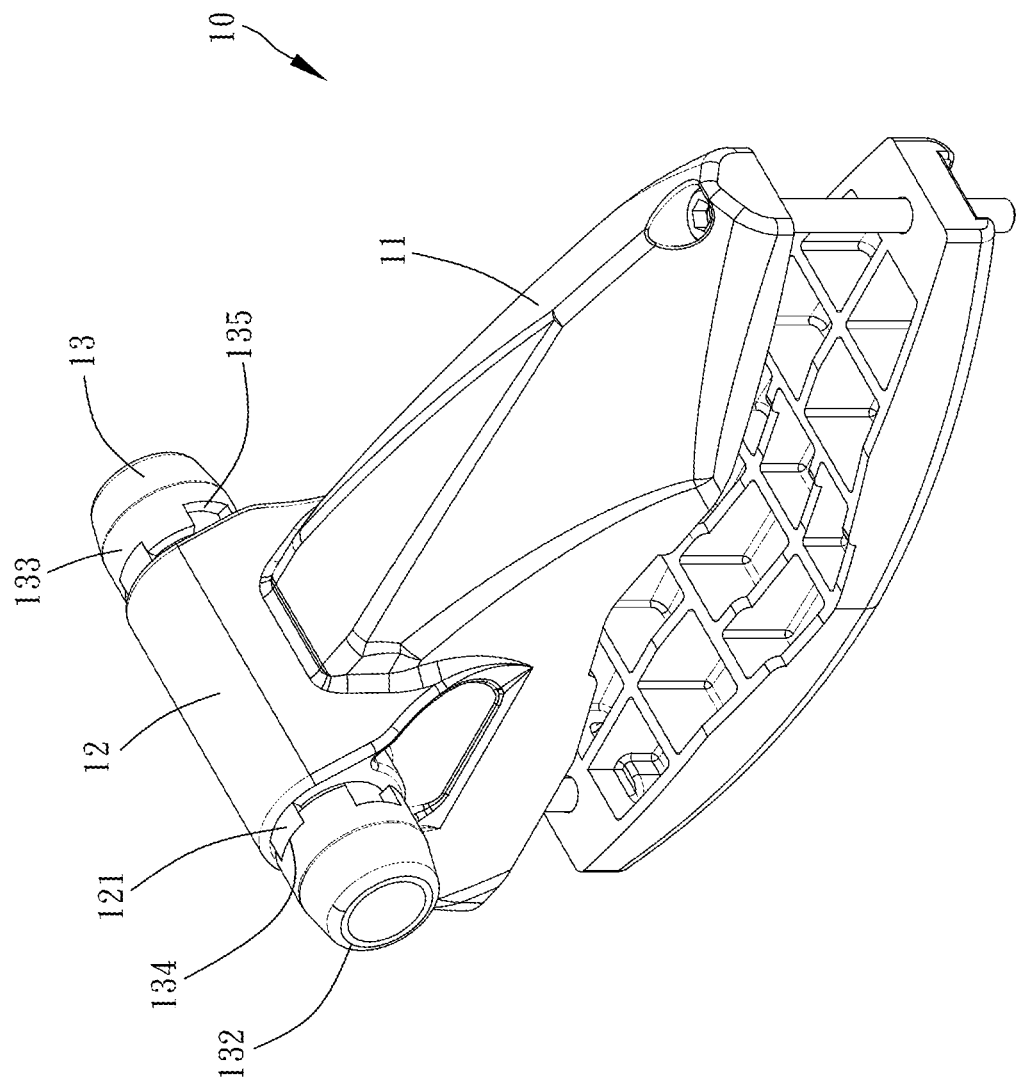
FIG. 2 corresponds to FIG. 1 when viewed from another angle.

Referring to FIGS. 1-5, the invention provides a mounting specification adjustable front fork mount 10 for mounting on a bike rack on a car roof for securing a bicycle front fork 20 of any of different specifications. The front fork mount 10 mainly comprises a holder 11 and two mounting tubes 13.

The holder 11 comprises an upper clamping block 111, a lower clamping block 112, and a shaft tube 12 fastened to the upper clamping block 111. The shaft tube 12 has at least one protruding portion 121 located on each of two opposite ends thereof. Each protruding portion 121 extends outward from the respective end of the shaft tube 12 in the axial direction. Each protruding portion 121 is shaped like a rectangular block and protrudes from the shaft tube 12 by a predetermined length. In this embodiment, each of the two opposite ends of the shaft tube 12 is provided with two protruding portions 121, and the two protruding portions 121 are respectively located at the opposing top and bottom sides of the respective end of the shaft tube 12. The upper clamping block 111 and the lower clamping block 112 can be pivoted and locked to one rod member of the above-mentioned bike rack by two pivots 113. Because there are a variety of bike racks that are well known, we will not represent them by a schema.

The two mounting tubes 13 each comprise an insertion section 131 and an abutment section 132, and a latching section 133 between the insertion section 131 and the abutment section 132. The outer diameter of the insertion section 131 of each of the mounting tubes 13 is the same as the inner diameter of the shaft tube 12. The insertion section 131 of each of the mounting tubes 13 can be inserted into one end of the shaft tube 12. The insertion section 131 of each of the two mounting tubes 13 is peripherally provided with a plurality of ring grooves (not shown) for the mounting of O-rings 136. The outer diameter of the latching section 133 of each of the mounting tubes 13 is greater than the outer diameter of the insertion section 131. The latching section 133 of each of the mounting tubes 13 is provided with a first coupling recess 134 and a second coupling recess 135. The first coupling recess 134 and the second coupling recess 135 are combined with the protruding portions 121 of the shaft tube 12 to form respective rectangular grooves. The first coupling recess 134 and the second coupling recess 135 are recessed from the end of the latching section 133 adjacent to the insertion section 131 toward the abutment section 132. The bottom of the first coupling recess 134 and the bottom of the second coupling recess 135 are respectively spaced from the distal end of the abutment section 132 by different distances. In the preferred embodiment of the present specification, since the end of the latching section 133 adjacent to the insertion section 131 is straight, in terms of the depth of the first coupling recess 134 and the second coupling recess 135 from the latching section 133 to the abutment section 132, the depth of the first coupling recess 134 is small, and the depth of the second coupling recess 135 is large. By means of selectively engaging the protruding portion 121 into the first coupling recess 134 or the second coupling recess 135 to reach the bottom, a different protruding length of the abutment section 132 of the mounting tube 13 beyond the respective end of the shaft tube 12 is obtained. The abutment section 132 of each mounting tube 13 is used to hold a bicycle front fork 20 with a quick release 14 (more details later).

It is worth mentioning that, as long as the depth of the second coupling recess 135 is greater than the depth of the first coupling recess 134, the length of the protruding portion 121 may be equal to or greater than the depth of the second coupling recess 135. In the present preferred embodiment, as illustrated in the drawings, the length of the protruding portion 121 is equal to the depth of the second coupling recess 135 (please refer to FIGS. 1 and 2). When the protruding portion 121 is engaged in the first coupling recess 134 and stopped at the bottom, the total length of the shaft tube 12 and the two mounting tubes 13 is defined as a first length (indicated by L1 in the drawings). When the protruding portion 121 is engaged in the second coupling recess 135 and stopped at the bottom, the total length of the shaft tube 12 and the two mounting tubes 13 is defined as a second length (indicated by L2 in the drawings). Any design can be accepted as long as the first length L1 is greater than the second length L2. Therefore, under the condition that the protruding length of the protruding portion 121 beyond the shaft tube 12 is greater than the depth of the second coupling recess 135 and the depth of the second coupling recess 135 is greater than the depth of the first coupling recess 134, the first length L1 formed by engaging the protruding portion 121 into the first coupling recess 134 is still larger than the second length L2 formed by engaging the protruding portion 121 into the second coupling recess 135, which is still within the scope of the present invention, and it is believed that those skilled in the art can understand that.

Figure 3:
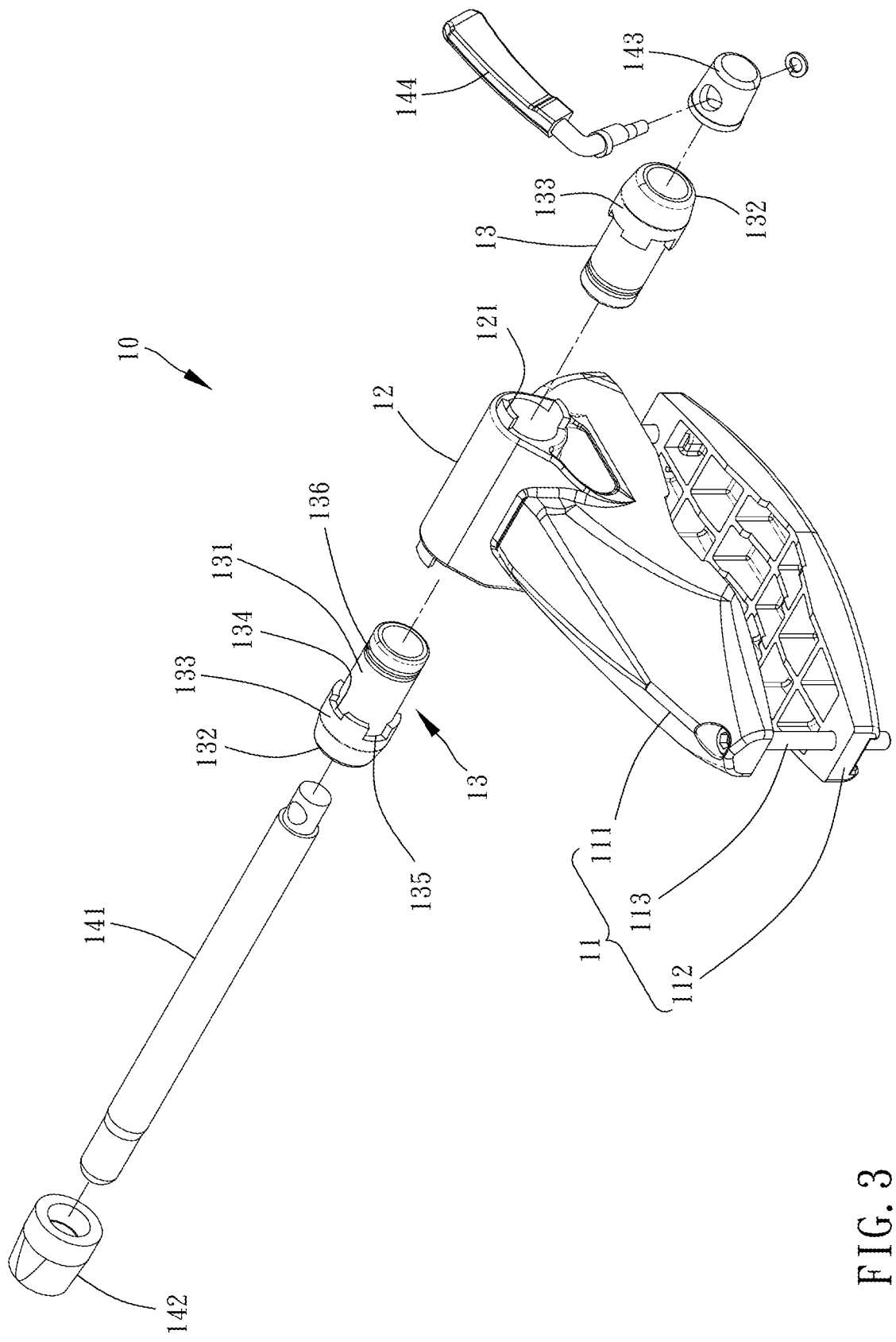
FIG. 3 is an exploded view of the mounting specification adjustable front fork mount used with a quick release in accordance with the present invention.
Figure 4:
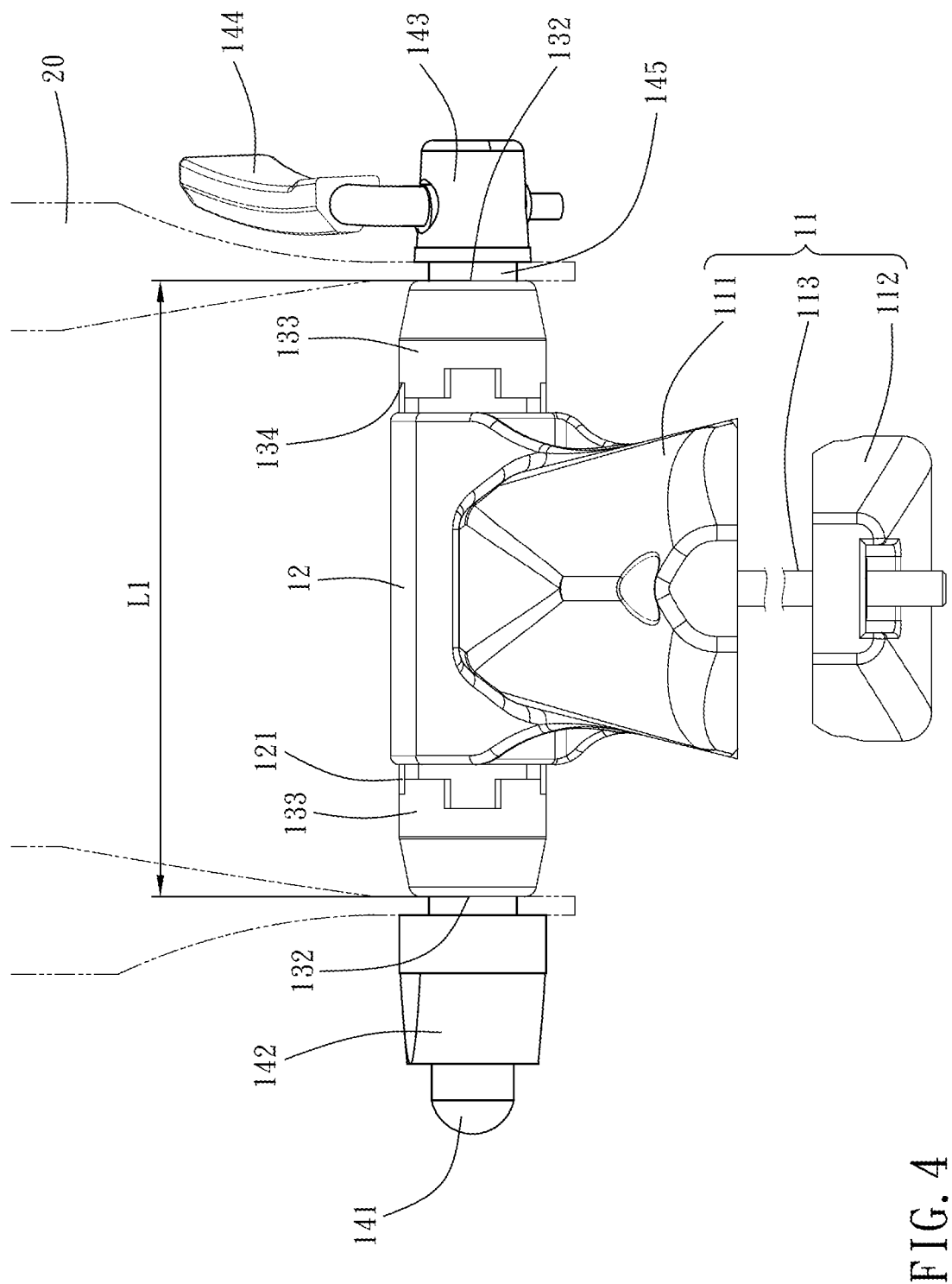
FIG. 4 illustrates a first application example of the mounting specification adjustable front fork mount in accordance with the present invention.

The quick release 14 comprises a shaft 141, an end block 142, a movable block 143 and an operating handle 144 (see FIG. 3). The end block 142 and the operating handle 144 are respectively located at the two opposite ends of the shaft 141. The movable block 143 is mounted on the shaft 141 and driven by the operating handle 144 to move along the shaft 141. The quick release 14 is incorporated in the holder 11. The shaft 141 is inserted through the two mounting tubes 13 with the two opposite ends thereof exposed outside the two mounting tubes 13. The two opposite ends of the shaft 141 that are exposed outside the abutment sections 132 of the two mounting tubes 13 are defined as bearing portions 145 (see FIG. 4 or FIG. 5). The two bearing portions 145 are respectively disposed between the abutment section 132 of one mounting tube 13 and the end block 142 and between the abutment section 132 of the other mounting tube 13 and the movable block 143. The two bearing portions 145 are used for supporting the bicycle front fork 20. When the operating handle 144 is actuated, the movable block 143 is moved toward the end block 142 such that the bicycle front fork 20 is clamped and attached to the abutment sections 132 of the two mounting tubes 13.

The structure and action of the components of the quick release 14 are well known and are not the main technical features of the present creation, and will not be described here.

The structure of the present invention has been described above, and the operational state of the present invention will be described next.

In use, the holder 11 of the present invention must be fixed on a bike rack. In installation, two pivots 113 are inserted through the upper clamping block 111 and the lower clamping block 112 and then locked to one rod member of the bike rack. Then, the operating handle 144 of the quick release 14 is loosened. At this point, the movable block 143 is unlocked and movable. In actual operation, according to the specifications of the bicycle front fork 20 (view the sign on the bicycle front fork 20 or through measurement), if the bicycle front fork 20 has a large spacing between the two forks, rotate the two mounting tubes 13 and select the first coupling recess 134 to cooperate with the protruding portion 121. Since the depth of the first coupling recess 134 is less than the length of the protruding portion 121, when the protruding portion 121 is engaged in the first coupling recess 134 and stopped at the bottom, a part of the protruding portion 121 is exposed outside the first coupling recess 134. When the shaft tube 12 and the two mounting tubes 13 are assembled, the total length is the first length L1 (the first length L1 is equal to the spacing of the bicycle front fork 20 that has a large spacing between the two forks), thus, the bicycle front fork 20 can be attached to the bearing portions 145 of the shaft 141 that are exposed outside the abutment sections 132 of the two mounting tubes 13 (see FIG. 4). Then, the operating handle 144 is fastened tight. At this time, the movable block 143 and the end block 142 are moved toward the mounting tubes 13, and the bicycle front fork 20 is clamped by the movable block 143, the end block 142 and the abutment sections 132 of the mounting tubes 13, completing the action of fixing the bicycle front fork 20.

Figure 5:
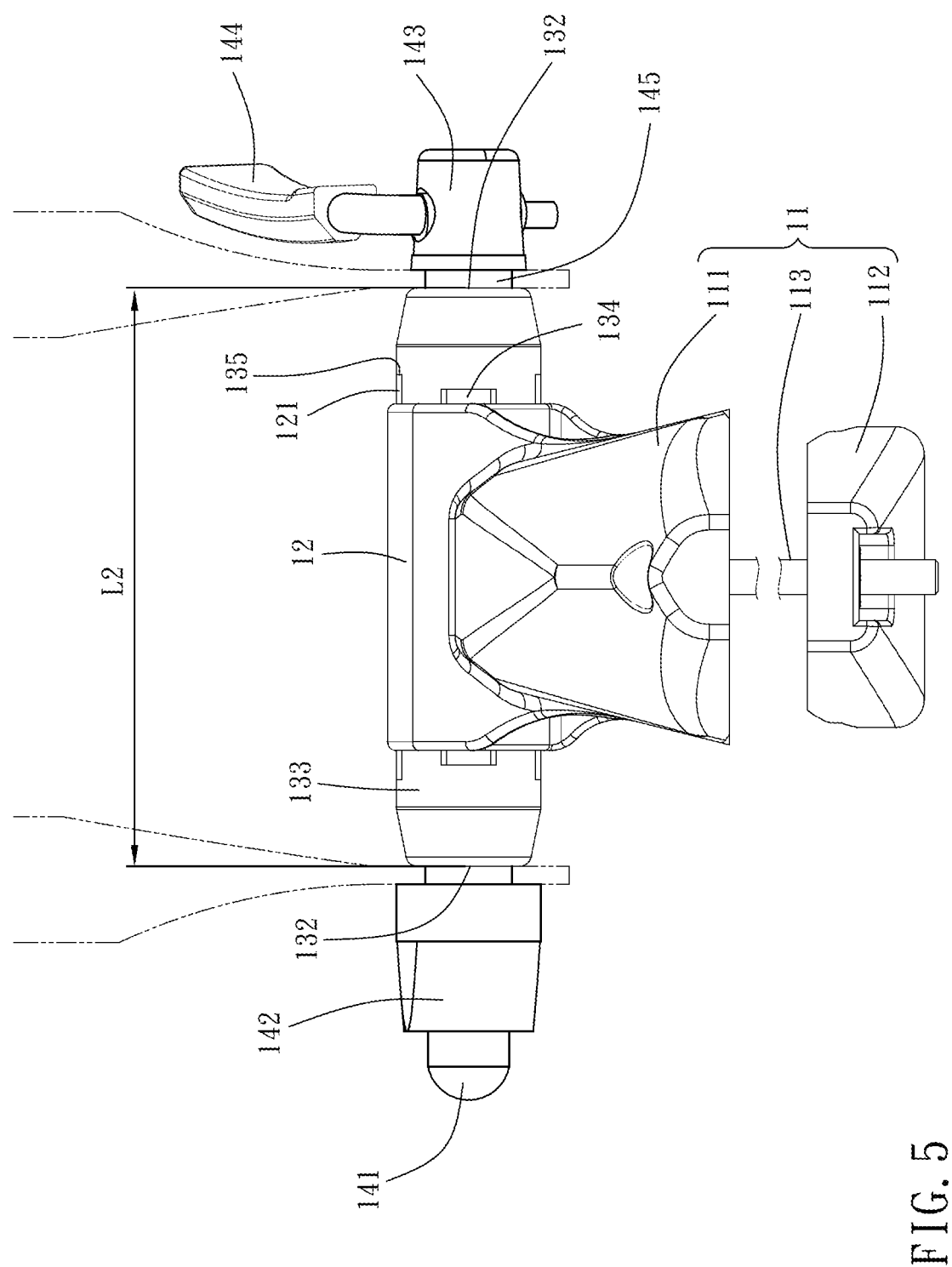
FIG. 5 illustrates a second application example of the mounting specification adjustable front fork mount in accordance with the present invention.

As shown in FIG. 5, if the bicycle front fork 20 has a small spacing between the two forks, rotate the two mounting tubes 13 and select the second coupling recess 135 to cooperate with the protruding portion 121. Since the depth of the second coupling recess 135 is equal to the length of the protruding portion 121, when the shaft tube 12 and the two mounting tubes 13 are assembled, the total length is the second length L3 (the second length L2 is equal to the spacing of the bicycle front fork 20 that has a small spacing between the two forks), thus, the bicycle front fork 20 can be attached to the bearing portions 145 of the shaft 141 that are exposed outside the abutment sections 132 of the two mounting tubes 13. Then, the operating handle 144 is fastened tight. At this time, the movable block 143 and the end block 142 are moved toward the mounting tubes 13, and the bicycle front fork 20 is clamped by the movable block 143, the end block 142 and the abutment sections 132 of the mounting tubes 13, completing the action of fixing the bicycle front fork 20.

As can be seen from the above description, the present invention can utilize the first coupling recess 134 and the second coupling recess 135 of the two mounting tubes 13, so that the protruding portion 121 can be selectively combined with the first coupling recess 134 to provide the first length L1, or with the second coupling recess 135 to provide the second length L2 that is different from the first length L1.

Thus, the protruding portion 121 can be selectively combined with the first coupling recess 134 or the second coupling recess 135 to fit different bicycle front forks 20 of different specifications, without the need to carry an adapter separately or to repeatedly mount and dismount an adapter, providing easy-to adjust functionality. It is indeed possible to achieve the purpose of the invention.

The number of the coupling recesses provided in each of the mounting tubes 13 is not limited to two, and it can be three or more, and the distance between the bottom of each coupling recess and the distal end of the abutment section 132 is different.

What is claimed is:

1. A mounting specification adjustable front fork mount for mounting on a bike rack on a car roof for securing a bicycle front fork of one of various different specifications, the mounting specification adjustable front fork mount comprising:

a holder comprising a shaft tube, said shaft tube having a protruding portion extended from each of two opposite ends thereof for a predetermined length; and two mounting tubes each comprising an insertion section, an abutment section and a latching section connected between said insertion section and said abutment section, said insertion section of each of said two mounting tubes being respectively inserted from the two opposite ends of said shaft tube into the inside of said shaft tube, said latching section of each said mounting tube being provided with a first coupling recess and a second coupling recess, said first coupling recess and said second coupling recess each having a bottom thereof respectively spaced from a distal end of said abutment section by a different distance, said first coupling recess and said second coupling recess being provided for the insertion of said protruding portion of said shaft tube into abutment against the said bottom of said first coupling recess or said second coupling recess in a selective manner so that when said protruding portion of said shaft tube is engaged in said first coupling recess or said second coupling recess, the protruding length of said abutment section of each said mounting tube outside said shaft tube is different, said two mounting tubes being used with said shaft tube to cooperate with a quick release for clamping a bicycle front fork by means of said abutment section of each of said two mounting tubes.

2. The mounting specification adjustable front fork mount as claimed in claim 1, wherein each said protruding portion extends outward from the respective end of said shaft tube in the axial direction; the outer diameter of said insertion section of each said mounting tube is equal to the inner diameter of said shaft tube; the outer diameter of said latching section of each said mounting tube is greater than the outer diameter of said insertion section; said first coupling recess and said second coupling recess are recessed from the end of said latching section adjacent to said insertion section toward said abutment section.

3. The mounting specification adjustable front fork mount as claimed in claim 2, wherein the end of said latching section adjacent to said insertion section is straight; the depth of said first coupling recess from said latching section toward said abutment section is relatively smaller than the depth of said second coupling recess from said latching section toward said abutment section; the length of said protruding portion is equal to or larger than the dept of said second coupling recess; when said protruding portion is engaged in said first coupling recess, the total length of said shaft tube and said two mounting tubes is defined as a first length; when said protruding portion is engaged in said second coupling recess, the total length of said shaft tube and said two mounting tubes is defined as a second length that is smaller than said first length.

4. The mounting specification adjustable front fork mount as claimed in claim 3, wherein said protruding portion is a rectangular block; said first coupling recess and said second coupling recess are rectangular grooves.

5. The mounting specification adjustable front fork mount as claimed in claim 1, wherein each said mounting tube has a plurality of grooves extended around the periphery of said insertion section for the mounting of O-rings.

6. The mounting specification adjustable front fork mount as claimed in claim 1, wherein said holder comprises an upper clamping block and a lower clamping block, said upper clamping block and said lower clamping block being locked to one rod member of a bike rack on the rood of a car by two pivots that are inserted through said upper clamping block and said lower clamping block; said shaft tube is fastened to said upper clamping block of said holder.

7. The mounting specification adjustable front fork mount as claimed in claim 1, wherein said quick release is incorporated in said holder, comprising a shaft, an end block, a movable block and an operating handle, said end block and said operating handle being relatively located at two opposite ends of said shaft, said movable block being movably mounted on said shaft and driven by said operating handle to move along said shaft; said shaft being inserted through said two mounting tubes with two opposite ends thereof exposed outside said two mounting tubes, the two opposite ends of said shaft that are exposed outside said abutment sections of said two mounting tubes are defined as bearing portions, said two bearing portions being respectively disposed between said abutment section of one said mounting tube and said end block and between said abutment section of the other said mounting tube and said movable block, said two bearing portions being used for supporting the bicycle front fork.

* * * * *